(12) United States Patent
Bai et al.

(10) Patent No.: US 11,099,290 B2
(45) Date of Patent: Aug. 24, 2021

(54) ATTENUATING SURFACE WAVES IN COMMON SHOT GATHERS OF SEISMIC DATA COLLECTED BY A SET OF GEOPHONES

(71) Applicant: Emerson Paradigm Holding LLC, Houston, TX (US)

(72) Inventors: Jianyong Bai, Katy, TX (US); Orhan Yilmaz, Houston, TX (US)

(73) Assignee: EMERSON PARADIGM HOLDING LLC, Houston, TX (US)

( * ) Notice: Subject to any disclaimer, the term of this patent is extended or adjusted under 35 U.S.C. 154(b) by 156 days.

(21) Appl. No.: 16/438,884

(22) Filed: Jun. 12, 2019

(65) Prior Publication Data

US 2020/0393588 A1 Dec. 17, 2020

(51) Int. Cl.
*G01V 1/36* (2006.01)
*G01V 1/28* (2006.01)

(52) U.S. Cl.
CPC .............. *G01V 1/362* (2013.01); *G01V 1/282* (2013.01); *G01V 2210/3246* (2013.01); *G01V 2210/614* (2013.01)

(58) Field of Classification Search
CPC .......... G01V 1/28; G01V 1/362; G01V 1/282; G01V 2210/67; G01V 2210/22; G01V 2210/3246; G01V 2210/614; G06F 17/18; G06F 30/20
See application file for complete search history.

(56) References Cited

U.S. PATENT DOCUMENTS

| 6,687,618 B2 * | 2/2004 | Bevc | G01V 1/303 |
| | | | 702/14 |
| 8,428,925 B2 * | 4/2013 | Krebs | G06F 30/20 |
| | | | 703/10 |
| 8,437,998 B2 * | 5/2013 | Routh | G01V 1/28 |
| | | | 703/10 |
| 2019/0324167 A1 * | 10/2019 | Zhang | G06F 17/18 |

OTHER PUBLICATIONS

U.S. Appl. No. 16/282,077, filed Feb. 21, 2019, Hollander et al.
(Continued)

*Primary Examiner* — Elias Desta
(74) *Attorney, Agent, or Firm* — Pearl Cohen Zedek Latzer Baratz LLP (57) ABSTRACT

A system and method for attenuating surface waves in common shot gathers of seismic data recorded by a set of geophones by: iteratively executing a genetic algorithm over a plurality of generations to generate an optimal one-dimensional (1D) Earth model based on the common shot gather data by, successively refining a pool of candidate Earth models to better fit the common shot gather data, until optimal Earth models in sequential generations converge; generating synthetic surface wave data based on the optimal Earth model and canceling the synthetic surface wave data from the common shot gather data to generate new common shot gather data that reduces the noise due to surface waves; and iteratively executing the genetic algorithm over each new common shot gather data until optimal Earth models generated in sequential iterations of the genetic algorithm converge.

26 Claims, 7 Drawing Sheets

(56) References Cited

OTHER PUBLICATIONS

Bergamo et al., "Estimation of p- and s-wave velocity model of unconsolidated granular materials through surface wave multimodal inversion", 83rd Annual International Meeting, 2013, SEG, Expanded Abstracts, pp. 1776-1781.

Boiero et al., "Guided-waves inversion and attenuation", 75th EAGE Conference and Exhibition incorporating SPE EUROPEC 2013, Expanded Abstracts.

Boiero et al., "Surface- and guided-wave inversion for near-surface modeling in land and shallow marine seismic data", The Leading Edge, 2013, pp. 638-646.

Cary et al., "Ground roll attenuation with adaptive eigenimage filter", 79th Annual International Meeting, 2009, SEG, Expanded Abstracts, pp. 3302-3305.

Dou et al., "Full-wavefield inversion of surface waves for mapping embedded low-velocity zones in permafrost", Geophysics, vol. 79, No. 6 Nov.-Dec. 2014, pp. EN107-EN124.

Douma et al., "Rayleigh-wave filtering through phase-velocity dispersion inversion and modeling: application to north Kuwait 3d seismic field data", 84th Annual International Meeting, 2014, SEG, Expanded Abstracts, pp. 4279-4283.

Gardner et al., "Formation velocity and density—the diagnostic basis for stratigraphic traps", Geophysics, vol. 39, No. 6 Dec. 1974, pp. 770-780.

Groos et al., "Application of a complete workflow for 2d elastic full-waveform inversion to record shallow-seismic Rayleigh waves", Geophysics, vol. 82, No. 2, Mar.-Apr. 2017, pp. R109-R117.

Haskell, N., "The dispersion of surface waves on multilayered media", Bull. Seismol. Soc. Am., 1953, pp. 17-34.

Luo, et al., "Rayleigh-wave dispersive energy imaging using a high-resolution linear radon transform", Pure and Applied Geophysics, vol. 165, 2008, pp. 903-922.

Mittet, R., "Free-surface boundary conditions for elastic staggered-grid modeling schemes", Geophysics, vol. 67, No. 5, Sep.-Oct. 2002, pp. 1616-1623.

Nelder et al., "A simplex method for function minimization", Computer Journal, 1965, pp. 308-313.

Park, et al., "Imaging dispersion curves of surface waves on multi-channel record", 68th Annual International Meeting, 1998, SEG, Expanded Abstracts, pp. 1377-1380.

Thomson, W., "Transmission of elastic waves through a stratified solid medium", Journal of Applied Physics, vol. 21, 1950, pp. 89-93.

Whitley, D., "A Genetic Algorithm Tutorial", Statistics and Computing, 1994, pp. 65-85.

Xu et al., "Numerical investigation of implementation of air-earth boundary by acoustic-elastic boundary approach", Geophysics, vol. 72, No. 5, Sep.-Oct. 2007, pp. SM147-SM153.

\* cited by examiner

ATTENUATING SURFACE WAVES IN COMMON SHOT GATHERS OF SEISMIC DATA COLLECTED BY A SET OF GEOPHONES

FIELD OF THE INVENTION

Embodiments of the invention relate to the field of tomographic scanning, and in particular, geological or seismic tomography for generating an image of the interior subsurface of the Earth based on geological data collected by transmitting a series of incident seismic waves and receiving reflections of those seismic waves at receivers, such as geophones, across geological discontinuities in the subsurface. The incident and reflected waves are reconstituted by a 3D model to generate an image of the reflecting surfaces interior to the Earth. Accordingly, geological or seismic tomography allows geophysicists to "see inside" the Earth without drilling into or disturbing the geology.

Embodiments of the invention further relate to improving the quality such images by attenuating or reducing coherent noise due to surface waves or ground roll, from the collected seismic data in land and marine surveys. New techniques are proposed herein to improve surface wave attenuation to generate tomographic images that are more accurate and generated faster than in conventional systems. These images may aid geoscientists in exploring the subsurface geology for applications such as predicting tectonic motion or Earthquakes, or by exploration engineers in the mining or oil and gas industries.

BACKGROUND OF THE INVENTION

Tomography is an imaging technique for displaying a representation of a cross section through a solid object using any kind of penetrating wave. Tomography is used in various areas of science, such as radiology, archaeology, medicine, atmospheric science, geophysics, and oceanography.

In geophysics, geological or seismic tomography utilizes a computer process that combines many seismic wave reflections taken from various angles to generate cross-sectional (tomographic) images of the subsurface of the Earth. Common shot gathers are used to gather seismic waves with common attributes that penetrate the interior subsurface of the Earth and reflect at points along boundaries of those subsurface layers ("penetrating waves"). However, not all waves penetrate the subsurface. Some waves, referred to e.g. as "surface waves," such as, Rayleigh waves, travel at or near ground surface, like a wave rolling across a body of water, but never penetrate the deeper layers within the subsurface. Low-velocity Rayleigh waves act as coherent noise, drowning out the signals of the penetrating waves, and are disproportionately loud because they are not dampened by travelling through the Earth's subsurface. This kind of noise is usually known as ground roll. This presents a problem in the art of seismic tomography, in which common shot gathers are degraded by undesirable surface waves that mask desired reflection signals of penetrating waves.

Accordingly, there is a need in the art to improve seismic imaging by attenuating or removing surface waves from the common shot gathers.

SUMMARY OF THE INVENTION

According to some embodiments of the invention, there is provided a system and a method for attenuating surface waves in common shot gathers of seismic data recorded by a set of seismic recorders, such as, geophones. The common shot gather data recorded by the set of geophones may have noise due to surface waves. An optimal Earth model based on the common shot gather data may be generated by iteratively executing a "genetic" or "evolutionary" algorithm over a plurality of iterations or generations to preferentially propagate the best performing or fittest models. In each sequential generation, a pool of candidate Earth models may be successively refined at least partially randomly to better fit the common shot gather data, until the fittest or optimal Earth models in sequential generations converge. While genetically refining Earth models increases accuracy, its randomization may lead to a slow convergence to a final optimal model. To speed up the genetic algorithm, the candidate Earth models may be restricted to a pool of one-dimensional (1D) models, each be defined by a different set of geophysical parameters that are only allowed to vary vertically, but not laterally (i.e., in one dimension). Each different set of geophysical parameters may define different value combinations of geophysical parameters selected from the group consisting of: thickness, P-wave velocity ($V_p$), S-wave velocity ($V_s$), density, and quality factors ($Q_p$ and $Q_s$) for P-wave and S-wave, respectively. The Earth models may be viscoelastic (anelastic), elastic, or acoustic.

Synthetic surface wave data may be generated based on the optimal Earth model. The synthetic surface wave data may be canceled from the common shot gather data to generate new common shot gather data that reduces the noise due to surface waves. However, because the synthetic surface wave data is generated based on a simplified 1D Earth model, it generally differs from the real surface wave data formed in the Earth that varies in 3D. To address these inaccuracies, a multi-scale process may implement an additional iterative loop, in which the aforementioned genetic algorithm may be iteratively executed over each new common shot gather data, each iteration cancelling more and more of the synthetic surface wave data. This multi-scale iteration may repeat e.g. until the synthetic surface wave data is sufficiently suppressed and/or optimal Earth models generated in sequential multi-scale iterations converge.

In some embodiments of the invention, a propagator matrix method is applied to generate the synthetic surface wave data. In some embodiments of the invention, a matching filter may be applied to the synthetic surface wave data to optimize the synthetic surface wave data for attenuation from the common shot gathers. The synthetic surface wave data may be cancelled from the common shot gather data by adaptive subtraction.

In some embodiments of the invention, each generation of the genetic algorithm may include generating a new pool of candidate Earth models. A subset of the pool of candidate Earth models may be selected that best fit the common shot gather data. The subset of candidate Earth models may be perturbed by randomly or semi-randomly altering the set of geophysical parameters for at least some of the candidate Earth models to generate a new pool of candidate Earth models. Perturbing a candidate Earth model may include altering one or more parameters in the model's set of geophysical parameters by mutation, crossover with another model, and/or another random or semi-random change in one or more of the parameters. The new pool of perturbed candidate Earth models may replace the previous pool of candidate Earth models. This process may continue until optimal Earth models in sequential generations converge.

In each generation of the genetic algorithm, the subset of Earth models may be selected that have a difference between a dispersion spectrum of modeled common shot gather data generated based on the candidate Earth model and a dispersion spectrum of the received common shot gather data which is below a predetermined threshold. In some embodiments of the invention, the subset of Earth models are selected in two-phases. The two-phase selection may comprise a first "rough" global pass for speed and efficiency and a second "fine" local pass to gain accuracy at a higher resolution. Each pass may minimize the difference between the dispersion spectrum of data associated with the Earth models and the dispersion spectrum of the true recorded data, first "globally" where the physical parameters of the candidate Earth models are varied throughout the entire (global) search space, then "locally" when the physical parameters of the candidate Earth models are varied within a subset (local neighborhood) of the search space. Global optimization may refer to finding the optimal value of an optimization function among all possible physical parameters whereas local optimization finds the optimal value within the neighboring set of candidate physical parameters. The optimization function (e.g., EQN. 1) may measure a misfit or difference between the synthetic dispersion spectrum (e.g., generated based on each set of candidate physical parameters for a candidate Earth model) and the dispersion spectrum of the real-world recorded common shot gather data. The dispersion spectrum may be obtained from a synthetic/recorded shot gather using a high-resolution Radon transform. The first optimization phase may include performing a global difference minimization between the dispersion spectra of the recorded and modeled common shot gather data to select an initial subset of the candidate Earth models. The second optimization phase may include performing a local difference minimization between the dispersion spectra of the recorded common shot gather data and modeled common shot gather data generated based on local adjustments of the initial subset of candidate Earth models generated by locally perturbing the set of geophysical parameters thereof. The global minimization performed in the first phase may involve using the genetic algorithm. The local difference minimization performed in the second phase may involve using e.g., a Nelder-Mead (NM) downhill simplex method. In some embodiments of the invention, the dispersion spectra are generated by high-resolution linear Radon transforms of the recorded and modeled common shot gather data.

In some embodiments of the invention, the optimal Earth models in sequential generations and/or iterations of the genetic algorithm converge when the differences between the dispersion spectrum of synthetic data from the Earth models obtained in the sequential generations and/or iterations and the dispersion spectrum of recorded seismic data are within a threshold measure of difference, within a threshold rate of difference, the algorithm reaches a threshold number of generations/iterations, or satisfies another predefined rule.

In some embodiments of the invention, the genetic algorithm may be executed over the entire set of common shot gather data, together at once. Alternatively, the common shot gather data may be divided into a plurality of subsets (e.g., divided into different azimuth ranges) and the genetic algorithm may be iteratively executed over each different subset of data (each iteration processing the model for a different azimuth range). Such a divide-and-conquer approach may be executed in parallel to further increase processing speed.

BRIEF DESCRIPTION OF THE DRAWINGS

The principles and operation of the system, apparatus, and method according to embodiments of the present invention may be better understood with reference to the drawings, and the following description, it being understood that these drawings are given for illustrative purposes only and are not meant to be limiting.

For simplicity and clarity of illustration, elements shown in the drawings have not necessarily been drawn to scale. For example, the dimensions of some of the elements may be exaggerated relative to other elements for clarity. Further, where considered appropriate, reference numerals may be repeated among the drawings to indicate corresponding or analogous elements throughout the serial views.

DETAILED DESCRIPTION OF THE INVENTION

Model-based techniques have been developed to attenuate ground roll by predicting an Earth model defined by a set of physical parameters, generating synthetic surface waves based on that Earth model, and subtracting the synthetic surface waves from the real-world recorded seismic data. The success and degree of such attenuation relies on the accuracy of the Earth model.

To predict an accurate Earth model, genetic algorithms were developed in which a number of candidate Earth models are evolved over time to find a best-fitting model. In each generation of evolution, the parameters of the candidate Earth models are genetically altered, e.g., by random mutations or recombination. The best-performing subset of Earth models propagate to the next generation of evolution, and the process is repeated over a number of generations until an optimal Earth model is found. Because of the random nature of genetic algorithms, evolution is often circuitous and inefficient, causing genetic algorithms to converge in a prohibitively slow amount of time or number of generations.

To speed up genetic algorithms, embodiments of the invention simplify each Earth model from three-dimensional (3D) to one-dimensional (1D). Each 1D Earth model is defined by physical parameters that are only allowed to change in one dimension (e.g., the vertical dimension), but not in any other (e.g., lateral) dimension. Optimizing physical parameters of the Earth model in only 1D is substantially simpler and faster than optimizing parameters in 3D. After the genetic algorithm is run to optimize the 1D Earth model, synthetic surface wave data is generated and subtracted from the common shot gather data to attenuate ground wave noise. However, because the physical parameters of the Earth change in all directions, utilizing a one-dimensional Earth model will lead to inaccuracies causing only partial attenuation of ground-roll noise.

To mitigate such inaccuracies due to using simplified 1D Earth models, embodiments of the invention apply a multi-scale technique to repeat the genetic algorithm over a number of iterations, wherein in each iteration new input common shot gather data is updated to remove the surface waves attenuated in the previous iteration. Thus, each multi-scale iteration incrementally reduces the surface waves until there is substantially no ground roll left or the effect of the ground roll is negligible. This multi-scale process thereby further attenuates surface waves to offset the inaccuracies introduced by the 1D Earth model simplification.

In some embodiments, each iteration removes a portion of the surface waves associated with the dominant parameters in the current iteration's 1D model. As the 1D model improves, iteratively attenuating surface waves, the dominant parameters for each iteration's 1D model may change. Iterating over different dominant parameters in different 1D models in each iteration of the multi-scale approach cumulatively approximates optimizing parameters for the full 3D model, while reducing processing time.

In some embodiments, the model may be further simplified by dividing the common shot gather data into a plurality of subsets, e.g., for different azimuth or offset ranges. The process may thus be further iterated over each subset of data, and the results aggregated to achieve a final solution of attenuation for the entire set of all common shot gather data.

Embodiments of the invention may further improve the genetic algorithm by optimizing the evolutionary selection method in two-phases. In a first phase, the genetic algorithm may perform a global difference minimization e.g., between the dispersion spectra of the recorded and modeled common shot gather data to select an initial subset of the candidate Earth models from a plurality of initial candidate Earth models. Each of the initial subset of candidate Earth models may have a difference between its synthetic dispersion spectrum and the dispersion spectrum of the received common shot gather data which is below a predetermined threshold. In a second phase, a local difference minimization, such as a Nelder-Mead downhill simplex method, may be performed between the dispersion spectra of the recorded common shot gather data and modeled common shot gather data generated based on local adjustments of the initial subset of candidate Earth models generated by locally perturbing the set of geophysical parameters thereof.

Embodiments of the invention may utilize a propagator matrix method to generate synthetic surface waves and may use high-resolution linear Radon transform to calculate synthetic dispersion spectra. Because the propagator matrix method is fast and efficient for 1D Earth models, it is possible for the genetic algorithm (global optimization) and simplex methods (local optimization) to quickly evaluate a large number of Earth models to determine one or more optimal models. For example, the propagator matrix method simplifies the generation of synthetic surface waves by utilizing a free-surface boundary in a top layer and a radiation condition in a bottom half space to determine particle displacement from one layer to another for a vertical force or a point explosion. Particularly, performing a secular or characteristic equation on the top layer can determine multi-modal phase velocities for each frequency and for each mode.

Another issue is that it is particularly difficult to subtract synthetic surface waves from actually collected seismic data because synthetic surface waves generated from a 1D Earth model may be different from real 3D surface waves in real recorded seismic data (e.g., in amplitudes and phases). One option to reduce the difference between the synthetic surface waves and real recorded surface waves would be to use full 3D Earth models to reduce the difference. However, utilizing 3D Earth models to generate synthetic surface waves is prohibitively complex and time consuming.

In contrast, utilizing a 1D Earth model together with the propagator matrix method, allows for simple and quick evaluation of a large number of Earth models in the genetic algorithm, and utilizing the simplex method generates synthetic surface waves with similar dispersion character (negligible misfit) to actual surface waves. Once an optimal model is estimated from the genetic algorithm (global optimization) and simplex method (local optimization), the optimal model may be used to generate synthetic surface waves from the propagator matrix method. A high-resolution linear Radon transform may be utilized to calculate the dispersion spectrum from the synthetic waves.

In order to mitigate the limits of 1D Earth model and recover and preserve desired signals as much as possible, the synthetic surface waves are adaptively subtracted from the recorded seismic data. For the adaptive subtraction, a least-square matching filter may be designed such that the residual energy between the seismic data and synthetic data is minimized. In other words, the filtered surface waves will match the recorded ground roll as closely as possible, in terms of travel times, amplitudes and/or wavelet shapes. This may result in the optimal attenuation of ground roll to recover and preserve the desired signals as much as possible.

Embodiments of the invention attenuate ground roll in significantly faster time than conventional genetic algorithms. For example, for an example set of 3D seismic data, it takes approximately 4 hours to generate synthetic surface waves using the conventional state of the art finite-difference or finite-elements methods, while it takes only several seconds (less than 10 seconds) to generate the synthetic data according to embodiments of the invention.

Embodiments of the invention thus provide techniques to improve the efficiency and accuracy of surface wave attenuation in common shot gathers of seismic data recorded by a set of geophones.

Figure 1:
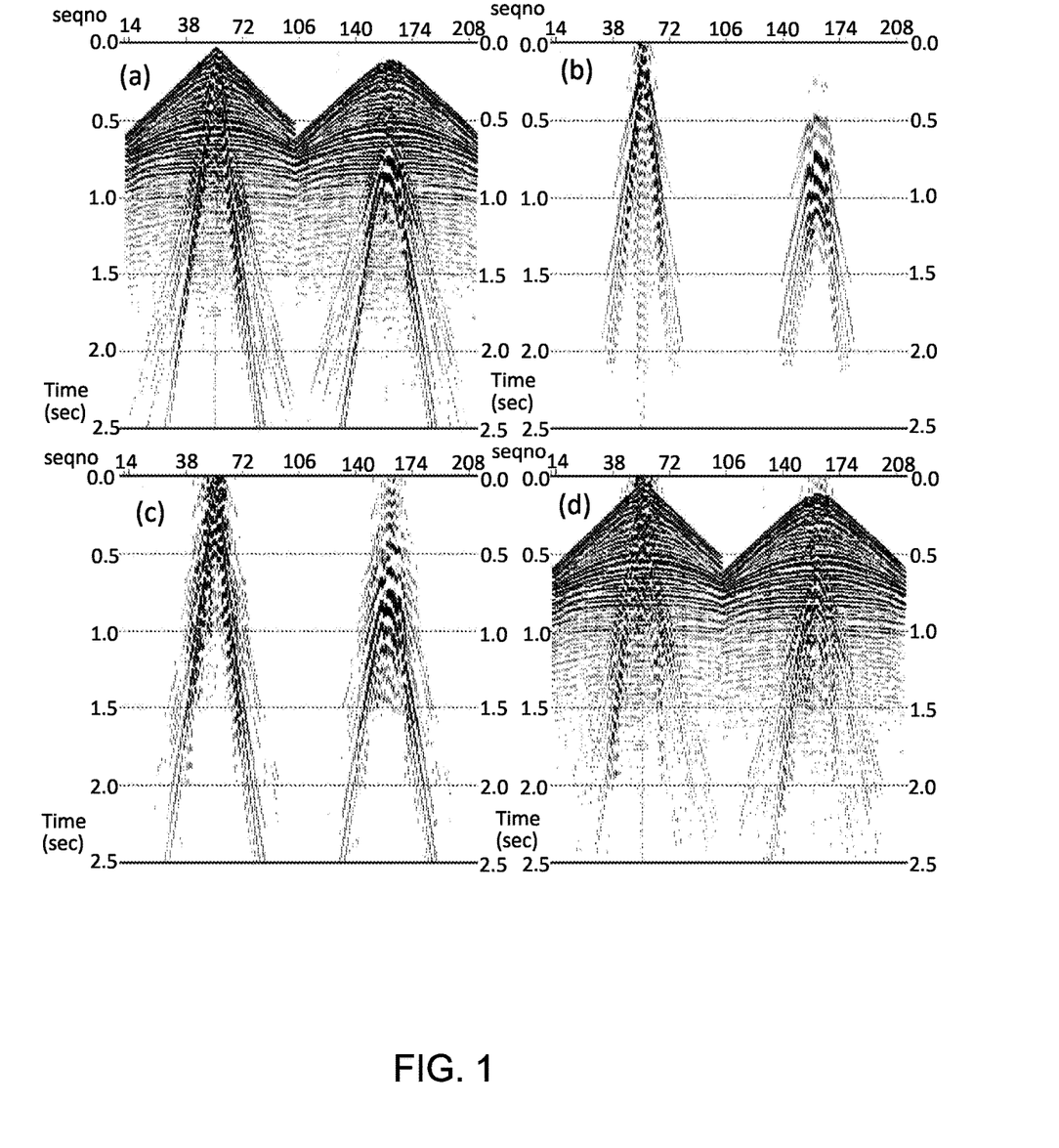
FIG. 1 illustrates examples of (a) input seismic data comprising two receiver lines from a 3D shot gather, (b) a synthetic surface wave generated from an optimal Earth model utilizing surface wave inversion, (c) a convolution of the synthetic surface wave with adaptive subtraction filters, and (d) ground-roll attenuation through the subtraction of the convolved synthetic surface wave from the input seismic data, according to an embodiment of the invention.

Reference is made to FIG. 1(a), which illustrates an example of input seismic data comprising two receiver lines from a 3D common shot gather recorded by a set of geophones, according to an embodiment of the invention. The common shot gather data has noise due to surface waves, which degrades and obscures the desired signals associated with penetrating waves. To attenuate the surface waves and remove this noise, embodiments of the invention iteratively generate an optimal Earth model for the recorded 3D common shot gather, from which synthetic surface waves are generated and canceled from the recorded 3D common shot gather before generating the next iteration's optimal Earth model. This iterative attenuation process may continue until the surface wave is completely attenuated or the effect of the remaining surface wave is negligible on the 3D shot gather.

To generate an optimal Earth model based on the common shot gather data, a global difference minimization, such as a genetic algorithm, may be iteratively executed over a plurality of generations. In each sequential generation, a pool of candidate Earth models may be successively refined to better fit the common shot gather data until optimal Earth models in sequential generations converge. For example, convergence may be met when a difference between dispersion spectra from two sequential iterations is below a predetermined threshold. Alternatively, convergence may be met depending on a visual inspection of sequential iterations, or a user may define a predetermined number of iterations that may be performed before the optimal Earth model is chosen.

As discussed above, to speed up the iterative process of using global difference minimization, such as the genetic algorithm, embodiments of the invention simplify the task by utilizing one-dimensional (1D) Earth models of the 3D shot gather. Each Earth model may be a viscoelastic model, an elastic model, or an acoustic model. The geophysical parameters that define the one-dimensional (1D) Earth models may include values of each vertical layer's physical properties, such as thickness h, P-wave velocity ($V_p$), S-wave velocity ($V_s$), density, and quality factors ($Q_p$ and $Q_s$) for P- and S-waves. The parameters of each one-dimensional (1D) Earth model may only change in one dimensions (e.g., the vertical dimension), but not in any other (e.g., lateral) dimension.

Embodiments of the invention may generate the initial pool of candidate one-dimensional (1D) Earth models from a random or semi-random population of physical or elastic properties such as h, $V_p$, $V_s$, density, $Q_p$ and $Q_s$. In various embodiments, the initial input set of properties may be selected randomly, semi-randomly (e.g., based on a range of variable values for elastic properties found in nature), or input from another method.

After the plurality of one-dimensional (1D) candidate Earth models are randomly or semi-randomly generated, a subset of the plurality of candidate Earth models may be selected which best fits the common shot gather data for that iteration (e.g., each candidate selected for the subset have a difference between its synthetic dispersion spectrum and dispersion spectrum of the received common shot gather data, which is minimal or lower than a predetermined threshold).

In some embodiments of the invention, the plurality of candidate Earth models which best fit the common shot gather data for a given iteration may be perturbed by altering one or more parameters in each of the sets of geophysical parameters to generate a new pool of candidate Earth models by mutation, crossover, or any other random or semi-random perturbation. In the next iteration, the pool of candidate Earth models may be replaced by the new pool of candidate Earth models. The global difference minimization, such as the genetic algorithm, may then be performed on the new pool of candidate Earth models to select the new candidate Earth models which best fits the common shot gather data for that iteration.

In some embodiments of the invention, the global difference minimization may be iteratively executed for a plurality of subsets of the received common shot gather data, e.g., divided into different azimuth ranges.

In some embodiments of the invention, the subset of Earth models is selected in two-phases. In the first phase, the initial subset of candidate Earth models may be selected by performing a global difference minimization between the dispersion spectra of the recorded and modeled common shot gather data. The global difference minimization may be performed using the genetic algorithm. In the second phase, a set of geophysical parameters of the initial subset of candidate Earth models may be perturbed, and a local difference minimization, such as Nelder-Mead (NM) downhill simplex method, may be performed between the dispersion spectra of the recorded common shot gather data and modeled common shot gather data generated based on local adjustments of the initial subset of candidate Earth models.

The pool of candidate Earth models may be replaced with the new pool of candidate Earth models until an optimal Earth model in sequential generations converge.

Embodiments of the invention may make it easier to evaluate the candidate Earth models by performing a Radon transform to generate 2D dispersion spectra from the synthetic surface waves from the candidate Earth models and from the actual surface waves recorded in the 3D shot gather. Each 2D phase spectrum may have a frequency axis and a phase velocity axis. The dispersion spectra from the 3D shot gather and the synthetic seismic data generated from candidate Earth models can be compared to evaluate the fit between the candidate Earth models and the 3D shot gather to determine an optimal model, as discussed further below. The 2D phase spectrum generated from the plurality of one-dimensional (1D) Earth models and the 2D phase spectrum generated from the 3D shot gather may be compared to quickly determine the best fit. In contrast, traditional surface-wave inversions inverts for physical parameters that can best fit dispersion curves picked from a 2D dispersion spectrum. However, in practice, it is difficult to identify and pick these dispersion curves. Accordingly, determining the fit between the candidate Earth models and the 3D shot gather by comparing dispersion spectra is significantly simpler and faster after such a transformation, and, thus, requires a lower amount of time, processing power, and memory to determine the fit.

Given a one-dimensional (1D) Earth model m, a misfit or difference between the synthetic dispersion spectrum and the dispersion spectrum of the received common shot gather data may be measured by an objective function J for a shot gather:

$$J(m) = \sqrt{\Sigma_{i=1}^{n_f} \Sigma_{j=1}^{n_v} (s_{ij} - o_{ij})^2 / (n_f n_v)} \qquad \text{(EQN. 1)}$$

where o is the dispersion spectrum of the shot gather, s is the dispersion spectrum of the synthetic data obtain from the one-dimensional (1D) model m, $n_f$ is the number of sampling points along the frequency axis in the 2D dispersion spectra, and $n_v$ is the number of sampling points along the phase velocity axis in the 2D dispersion spectra. Each spectrum may be normalized e.g., by its maximum spectrum amplitude in order to preserve relative amplitudes.

In the one-dimensional (1D) Earth model m, each layer of the model may be characterized, e.g., by its physical properties, such as thickness h, P-wave velocity ($V_p$), S-wave velocity ($V_s$), density, and/or quality factors ($Q_p$ and $Q_s$) for P- and S-waves, respectively, which do not vary in the horizontal direction. In the frequency domain, the propagator solution or layer propagator, from one layer to another, can be derived from an equation of movement. The eigenvalues and eigenvectors of a layer propagator may be obtained and may result in the decomposition of up and down-directional P and S waves and the computation of reflection and transmission coefficients at an interface between two adjacent layers. The propagator matrix method may utilize the propagator solution plus continuity conditions of reflection and transmission coefficients to generate a global matrix, known as propagate matrix, in order to simulate the wave propagation in layered Earth models.

The propagator matrix method simplifies the generation of synthetic surface waves by utilizing a free-surface boundary in a top layer and a radiation condition in a bottom half space to determine particle displacement from one layer to another for a vertical force or a point explosion. Particularly, performing a secular or characteristic equation on the top layer can determine multi-modal phase velocities for each frequency and for each mode.

Embodiments of the invention utilize the propagator matrix method to quickly and efficiently generate synthetic surface waves and utilize Radon transform to calculate dispersion spectra from the synthetic waves and from the received common shot gather data. The dispersion spectra are utilized by the global optimization, such as the genetic algorithm, to evaluate the fit or difference between the dispersion spectra for determining an optimal model. For example, once the secular or characteristic equation on the top layer generates the multi-modal phase velocities, those multi-modal phase velocities can be utilized to generate multi-modal synthetic surface waves by calculating Green's function at a receiver position.

As discussed above, utilizing a one-dimensional (1D) Earth model together with the propagator matrix method, allows for a sufficiently fast and efficient technique to evaluate enough models using a global optimization method, such as the genetic algorithm, to minimize a misfit in the dispersion spectrum of the synthetic surface waves generated from the 1D model and the dispersion spectrum of actual surface waves.

In some embodiments of the invention, the surface wave inversion procedure is set as a bound-constrained optimization problem, for which the optimal one-dimensional (1D) model m minimizes the objective function J, subject to:

$$m_i^l < m_i < m_i^u, \ i=1,2,\ldots,n \quad \text{(EQN. 2)}$$

where $m_i$ is the ith parameter of a layered model m, $m_i^l$ and $m_i^u$ are the lower and upper bounds of $m_i$, respectively, and n is the number of parameters.

For a r-layer model m, the updated parameters may be listed e.g., as $\{h_1, V_{s1}, \gamma_1, h_2, V_{s2}, \gamma_2, \ldots, h_i, V_{si}, \gamma_i, \ldots, h_{r-1}, V_{s,r-1}, \gamma_{r-1}, V_{sr}, \gamma_r\}$, where $h_i$ is the thickness of the ith layer, $V_{si}$ is the S-wave velocity of the ith layer, $\gamma_1$ is $$\frac{V_{pi}}{V_{si}},$$

$V_{pi}$ is the P-wave velocity of ith layer, and $V_1$ is either the S-wave velocity $V_{s1}$ or the P-wave velocity $V_{p1}$ of the first layer, and $h_r$ is not updated in the bottom half space.

Because surface wave propagation is particularly sensitive to the S-wave properties, embodiments of the invention may update $V_s$ for the various layers rather than updating $V_p$. Gardner's equation may be utilized to calculate the density for each layer. Both the quality factors ($Q_p$ and $Q_s$) for P- and S-waves may be specified and may not change in either the vertical or horizontal directions during surface-wave inversions.

As discussed above, because the propagator matrix method is fast and efficient for 1D Earth models, it is possible for the global optimization, such as the genetic algorithm, and the local difference minimization, such as the Nelder-Mead downhill simplex method, to quickly evaluate a large number of one-dimensional (1D) Earth models to determine an optimal model.

After optimal one-dimensional (1D) Earth models from two sequential generations converge, a synthetic surface wave, may be generated from the optimal Earth model. Reference is made to FIG. 1(b), which illustrates an example of a synthetic surface wave generated utilizing surface wave inversion from an optimal Earth model of the 3D shot gather from FIG. 1(a).

The synthetic surface waves may be attenuated or removed from the common shot gather data to generate new common shot gather data that reduces the noise due to surface waves. In some embodiments of the invention, to mitigate the limits of 1D Earth model and recover and preserve desired signals as much as possible, the synthetic surface waves are adaptively subtracted from the recorded seismic data. For example, prior to attenuating/removing the synthetic surface wave data from the common shot gather, an adaptive subtraction filter, such as a least-square matching filter, may be applied to minimize the residual energy between the synthetic and actual surface waves. Reference is made to FIG. 1(c), which illustrates an example of a convolution of the synthetic surface wave of FIG. 1(b) with an adaptive subtraction filter.

Reference is made to FIG. 1(d), which illustrates ground-roll attenuation through the subtraction of the convolved synthetic surface wave of FIG. 1(c) from the input seismic data, according to an embodiment of the invention.

After the synthetic surface wave has been subtracted from the input seismic data (FIG. 1(d)), a multi-scale process may iterate, generating a plurality of new datasets in FIGS. 1(a)-(d) based on a plurality of respective new optimal Earth models. Each iteration may input (e.g., in FIG. 1(a)) the edited seismic data output by the previous iteration (e.g., in FIG. 1(d)), which is used to generate new synthetic surface waves from the new optimal Earth model (e.g., see FIG. 1(b)), and these new synthetic surface waves (e.g., via their convolution in FIG. 1(c)) may be subtracted from the edited input seismic data to generate a new set of edited seismic data output by the current iteration (e.g., see FIG. 1(d)). This process may iteratively repeat until the surface wave in the edited seismic data is completely attenuated or the effect of the remaining surface wave is negligible on the edited input seismic data. For example, the process may iteratively continue to generate synthetic surface waves and attenuate them from the input seismic data until a difference between the dispersion spectra of the input seismic data before and after attenuating a synthetic surface wave for a given iteration is below a predetermined threshold. Alternatively, convergence may be met depending on a visual inspection of sequential iterations, or a user may define a predetermined number of iterations that may be performed to terminate the multi-scale iterative process.

Tests have shown that the embodiments of the invention described herein for attenuating surface waves from a common shot gather is fast and accurate. For example, a 3D seismic survey with 7616 common shot gathers of seismic data recorded by a set of geophones were used as the initial input for the tests. The sampling rate was 1 ms, and 3,000 time samples/traces were recorded for each shot. As can be seen in FIG. 1(a) low-velocity, low-frequency and high-amplitude ground roll is observed in the collected seismic data. The inversion procedure utilized a 4-layer one-dimensional (1D) Earth model where $V_s$ was updated in the top layer. For each layer, the thickness was limited between 3 and 30 meters, and both $Q_p$ and $Q_s$ are constant in both the vertical and horizontal directions. A vertical force was applied to generate synthetic surface waves with a maximum frequency of 18 Hz. 30 point filters were designed and applied in sliding windows of 15 ms for adaptive subtraction.

Figure 2A:
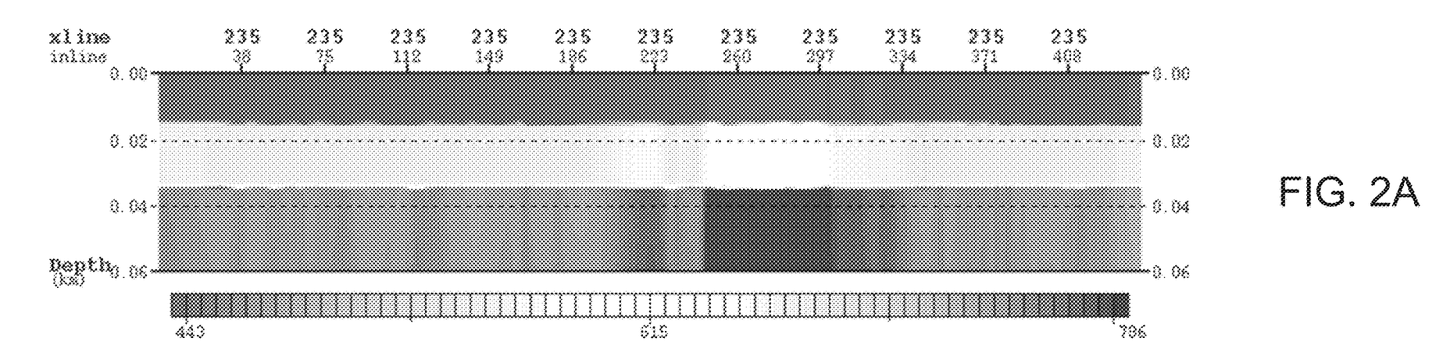
FIGS. 2A and 2B illustrate examples of a P-wave velocity ($V_p$) profile and a S-wave velocity ($V_s$) profile, respectively, obtained utilizing surface wave inversion to obtain a one-dimensional (1D) Earth model of the input seismic data illustrated in FIG. 1(a), according to an embodiment of the invention.
Figure 2B:
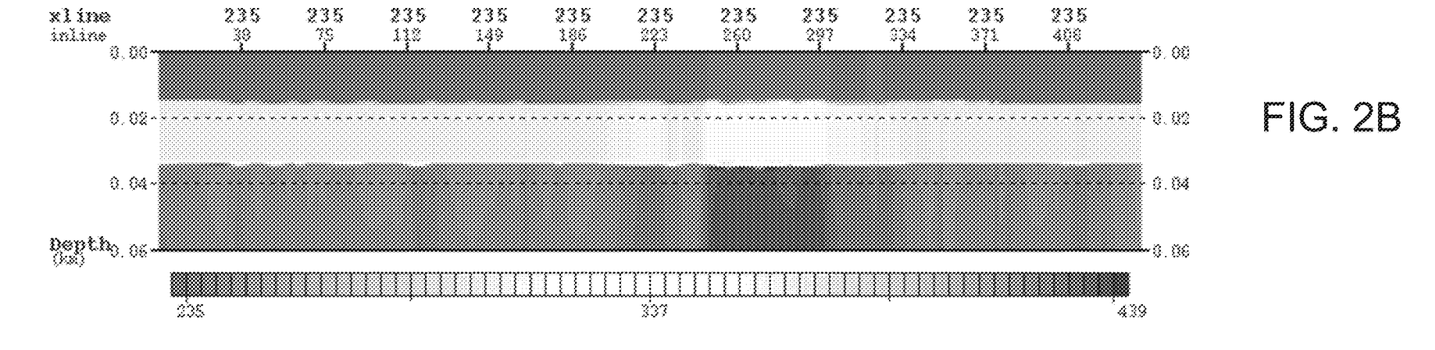
Figure 3A:
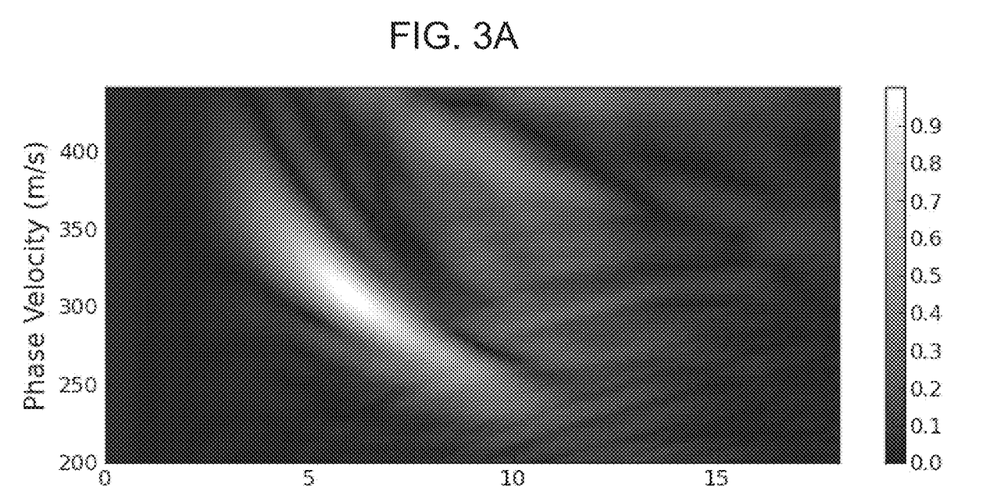
FIGS. 3A and 3B illustrate examples of dispersion spectra generated from the input seismic data of FIG. 1(a) and from the synthetic surface wave of FIG. 1(b), respectively, according to an embodiment of the invention.
Figure 3B:
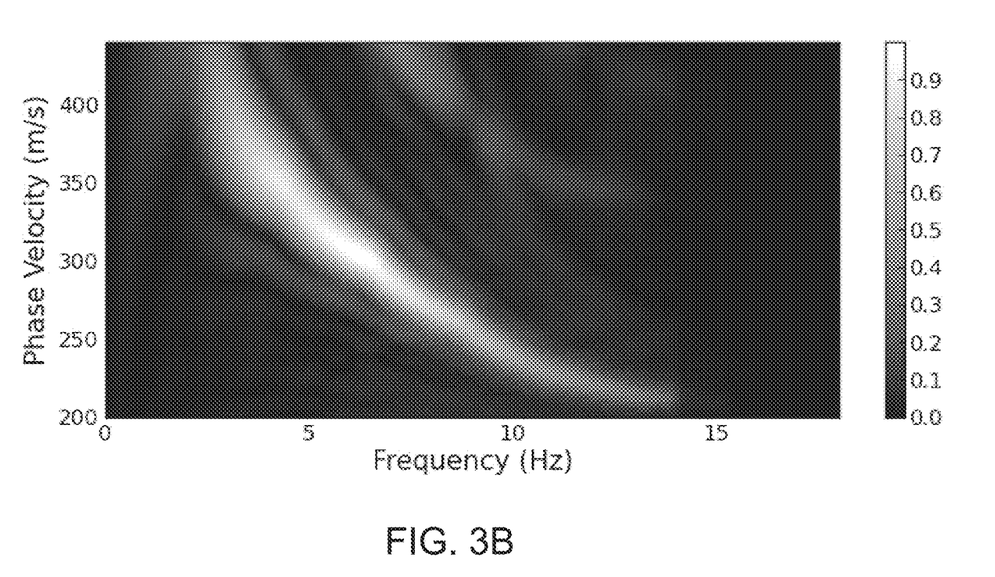
Figure 4:
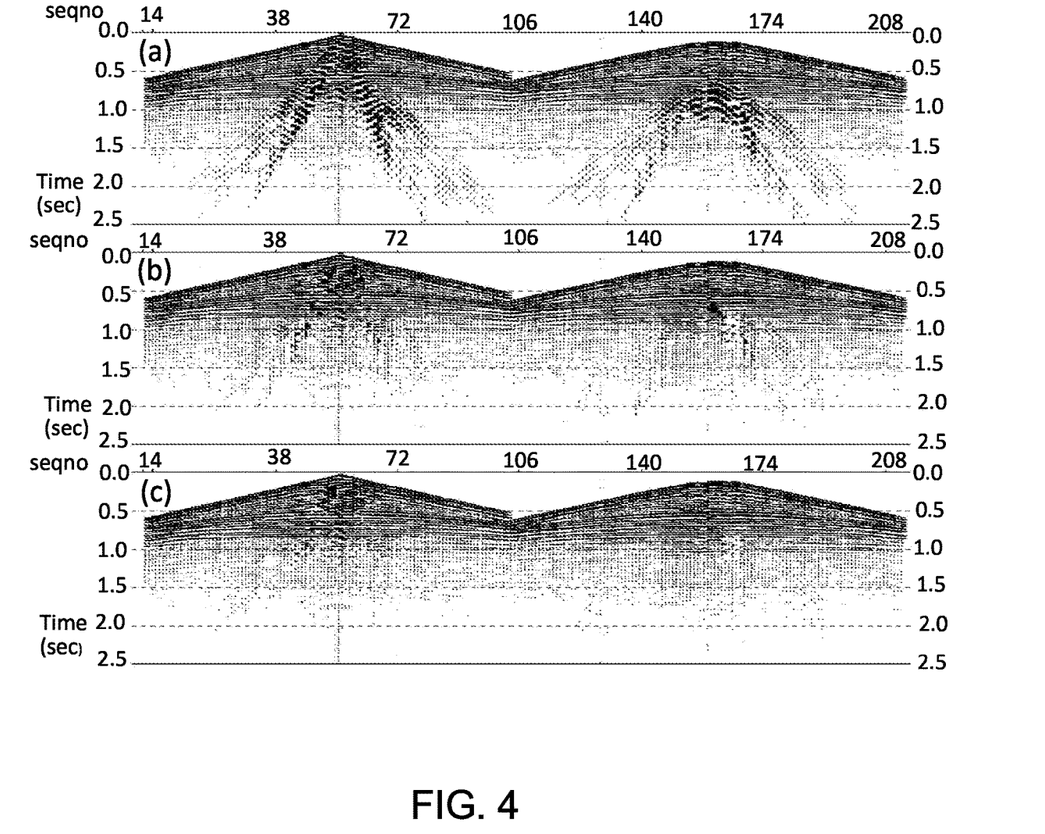
FIG. 4 illustrates the results of continuously performing ground-roll attenuation upon the input seismic data: (a) 1 time, (b) 7 times, and (c) 14 times, according to an embodiment of the invention.

Two tests were performed on the data in FIG. 1(a); the first test results shown in FIG. 1-3 and the second test results shown in FIG. 4.

In the inversion of the first test, γ, which is was $$\frac{V_p}{V_s},$$

limited to between 1.5 and 2.2 in each layer, and the following bounds were used for the values of $V_s$.

| Layer | $V_{s_{min}}$ (m/s) | $V_{s_{max}}$ (m/s) |
|---|---|---|
| 1 | 180 | 400 |
| 2 | 220 | 470 |
| 3 | 300 | 550 |
| 4 | 350 | 600 |

A genetic algorithm with 50 generations and a population size of 500 models per generation and a simplex method for 20 iterations was utilized to generate the optimal one-dimensional (1D) Earth model. The synthetic surface wave generated from the optimal one-dimensional (1D) Earth model is shown in FIG. 1(b). In general, the synthetic surface waves generated through this method match the ground roll present in the seismic data; however, to further improve the similarity of the modeled and recorded surface waves, a matching filter was convolved with the synthetic surface wave to get FIG. 1(c).

FIG. 1(d), which illustrates ground-roll attenuation through the subtraction of the convolved synthetic surface wave of FIG. 1(c) from the input seismic data, according to an embodiment of the invention. As can be seen in FIG. 1(d), the surface waves were significantly attenuated from the common shot gather data.

Reference is made to FIGS. 2A and 2B, which illustrates examples of a P-wave velocity profile ($V_p$) and a S-wave velocity profile ($V_s$), respectively, obtained utilizing surface wave inversion to optimize a one-dimensional (1D) Earth model of the input seismic data from FIG. 1(a), according to an embodiment of the invention. Optimization methods according to embodiments of the invention are used to find optimal Earth models to match the dispersion spectra for each shot gather. Corresponding parameter profiles as shown in FIGS. 2A and 2B can be created from the optimal models at each shot position.

In seismology, seismic attenuation describes the energy loss experienced by seismic waves due to anelastic processes or internal friction as they propagate. Attenuation is measured by a dimensionless quality known as the rock quality factors Qp for body wave (P-wave) and Qs for shear wave (S-wave). Qp and Qs are frequency-dependent. Normally Qp and Qs increases with frequency. At the same time, seismic waves can be distorted by velocity dispersion, that is, seismic velocities are frequency dependent. A dispersion spectrum may be generated from seismic data through a Radon transform. The dispersion spectrum may have a frequency axis and a phase-velocity axis, and characterizes the amplitude for each pair of frequency and phase velocity.

A dispersion spectrum demonstrates the seismic attenuation and velocity dispersion. For example, the dispersion spectra are shown in FIGS. 3A and 3B.

Reference is made to FIGS. 3A and 3B, which illustrate the dispersion spectra generated from the input seismic data of FIG. 1(a) and from the synthetic surface wave of FIG. 1(b), respectively, according to an embodiment of the invention. These figures show that after a series of generations of the genetic algorithm (e.g., 8 generations) and multi-scale iterations (e.g., 1 multi-scale loop), an optimal Earth model is found though surface-wave inversion. The optimal model is used to generate the synthetic surface waves shown in FIG. 1(b). Since the dispersion spectrum of the synthetic surface waves (FIG. 3B) is close enough to the actual spectrum (FIG. 3A), the synthetic surface waves in FIG. 1(b) is suitable to attenuate ground roll shown in FIG. 1(a).

The first test shows that embodiments of the invention are able to find an optimal Earth model that best matches the actual dispersion spectra of the common shot gather. Thus, synthetic surface waves generated from the optimal Earth model are suitable for ground-roll attenuation. Tests have also indicated that increasing the generations and population of the genetic algorithm (global difference minimization) and the iterations of the simplex method (local difference minimization) can increase the accuracy of matching dispersion spectra. However, the increases can significantly increase computation time and effort.

In the second test, γ was limited between 1.3 and 5.2 in each layer, and the following bounds were used for the values of $V_s$:

| Layer | $V_{s_{min}}$ (m/s) | $V_{s_{max}}$ (m/s) |
|---|---|---|
| 1 | 50 | 600 |
| 2 | 75 | 650 |
| 3 | 100 | 700 |
| 4 | 150 | 800 |

A genetic algorithm with 8 generations and a population size of 20 models per generation, and a simplex method for 20 iterations was utilized to generate the optimal one-dimensional (1D) Earth model. A series of simplex optimizations and adaptive subtraction was implemented 14 times. Only the fundamental-mode synthetic data was generated (e.g., the phase velocities along the fundamental curve are used to generate the synthetic data. In a dispersion spectrum, the fundamental-mode has the lowest phase velocity at each frequency).

Reference is made to FIG. 4, which illustrates the effect of the multi-scale approach, in which ground-roll attenuation is continuously performed upon the input seismic data: (a) 1 iteration; (b) 7 iterations, and (c) 14 iterations, according to an embodiment of the invention. FIG. 4 shows that surface waves are gradually removed through iterations. As can be seen in FIG. 4(b) most of the surface wave is removed after 7 iterations. As can be seen in FIG. 4(c), at the end of 14 iterations, ground roll is almost completely removed. Because a multi-scale technique is applied, the accuracy requirements for matching dispersion spectra are not high. This means that a small number of models can be evaluated in the inversion and, hence, the processing and memory requirements can be significantly reduced.

These tests show that the optimization methods described in the present application are able to find optimal Earth models to match the dispersion spectra for each shot gather. Corresponding parameter profiles can be created from the optimal models at each shot position. These optimal models may be used to generate synthetic surface waves suitable for ground-roll attenuation through adaptive subtraction via a multi-scale technique. These tests also demonstrate that the method is robust and can efficiently remove surface waves in practice and, hence, improve the signal-to-noise ratio. Although ground roll interferes with desired seismic signals, embodiments of the present invention only attenuate/remove ground roll from the recorded signals, while desired seismic signals are preserved. Embodiments of the invention thus provide techniques that are very helpful to seismic data processing and imaging, especially for land and shallow marine seismic data.

Figure 5:
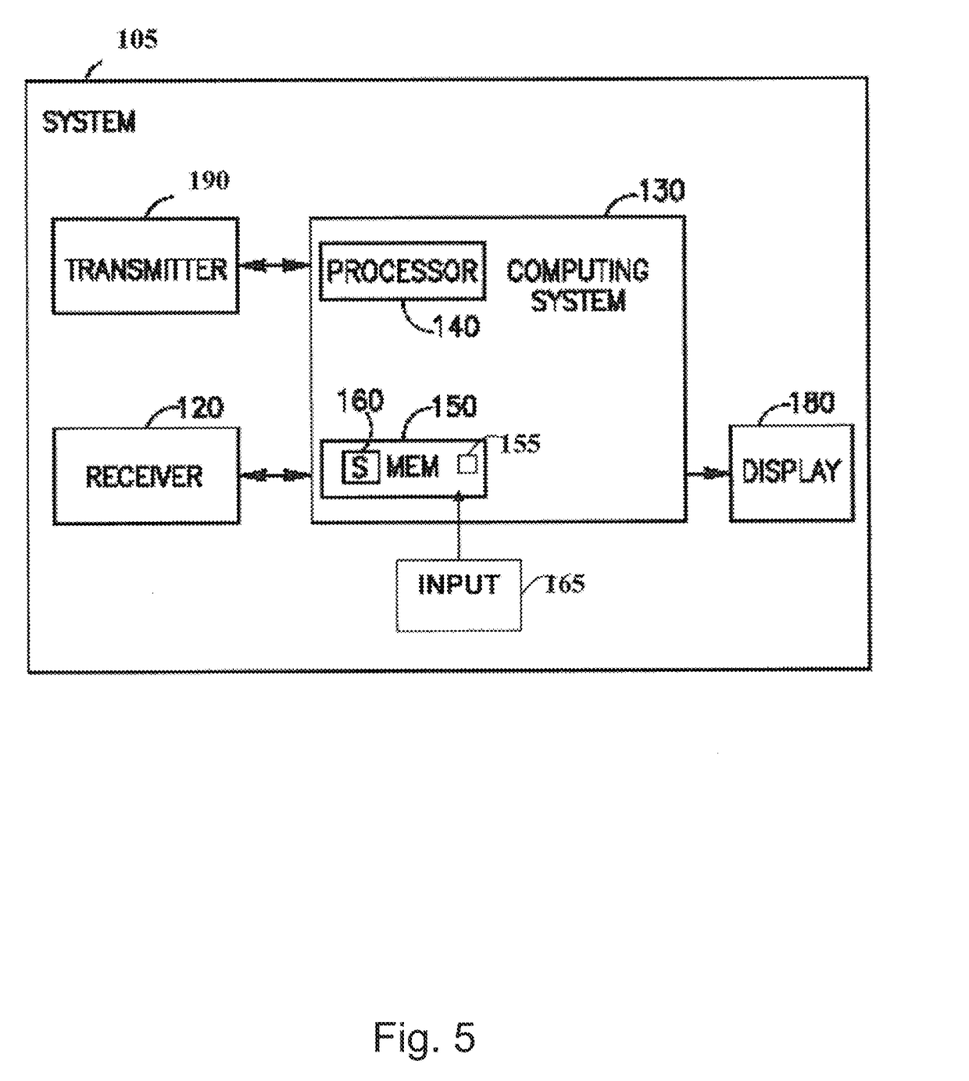
FIG. 5 schematically illustrates a system for improved attenuation of surface waves in common shot gathers of seismic data collected by a set of geophones, according to an embodiment of the invention.

Reference is made to FIG. 5, which schematically illustrates a system 105 for improved interpolation of seismic data collected by geophones, according to an embodiment of the invention.

System 105 may include one or more transmitter(s) 190, one or more receiver(s) 120, a computing system 130, and a display 180.

The one or more receiver(s) 120, e.g., geophones, may be configured to receive seismic data including both desirable penetrating waves and noise due to undesirable surface waves.

Computing system 130 may include, for example, any suitable processing system, computing system, computing device, processing device, computer, processor, or the like, and may be implemented using any suitable combination of hardware and/or software. Computing system 130 may include for example one or more processor(s) 140, memory 150 and software 160. Data 155 measured by the set of geophones and received by receiver 120, may be transferred, for example, to computing system 130. The data may be stored in the receiver 120 as for example digital information and transferred to computing system 130 by uploading, copying or transmitting the digital information. The data may be stored as raw seismic data and/or aggregated into common shot gathers of the seismic data. Processor 140 may communicate with computing system 130 via wired or wireless command and execution signals.

Memory 150 may include cache memory, long term memory such as a hard drive, and/or external memory, for example, including random access memory (RAM), read only memory (ROM), dynamic RAM (DRAM), synchronous DRAM (SD-RAM), flash memory, volatile memory, non-volatile memory, cache memory, buffer, short term memory unit, long term memory unit, magnetic tape, or other suitable memory units or storage units. Memory 150 may store instructions (e.g., software 160) and data 155 to execute embodiments of the aforementioned methods, steps and functionality (e.g., in long term memory, such as a hard drive). Data 155 may include, for example, raw seismic data collected by receiver 120, common shot gathers of the seismic data, candidate and optimal Earth models, synthetic and/or actual dispersion spectra, etc., and any other data or instructions necessary to perform the disclosed embodiments of the present invention. Data 155 may also include intermediate data generated by these processes and data to be visualized, such as data representing graphical models to be displayed to a user. Memory 150 may store intermediate data. System 130 may include cache memory which may include data duplicating original values stored elsewhere or computed earlier, where the original data may be relatively more expensive to fetch (e.g., due to longer access time) or to compute, compared to the cost of reading the cache memory. Cache memory may include pages, memory lines, or other suitable structures. Additional or other suitable memory may be used.

Computing system 130 may include a computing module having machine-executable instructions. The instructions may include, for example, a data processing mechanism (including, for example, embodiments of methods described herein) and a modeling mechanism. These instructions may be used to cause processor 140 using associated software 160 programmed with the instructions to perform the operations described. Alternatively, the operations may be performed by specific hardware that may contain hardwired logic for performing the operations, or by any combination of programmed computer components and custom hardware components.

Embodiments of the invention may include an article such as a non-transitory computer or processor readable medium, or a computer or processor storage medium, such as for example a memory, a disk drive, or a USB flash memory, encoding, including or storing instructions, e.g., computer-executable instructions, which when executed by a processor or controller, carry out methods disclosed herein.

Display 180 may display data from transmitter 190, receiver 120, or computing system 130 or any other suitable systems, devices, or programs, for example, an imaging program or a transmitter or receiver tracking device. Display 180 may include one or more inputs or outputs for displaying data from multiple data sources or to multiple displays. For example, display 180 may display a simulation of a 3D model of seismic data from which ground roll is attenuated or removed.

Input device(s) 165 may include a keyboard, pointing device (e.g., mouse, trackball, pen, touch screen), or cursor direction keys, for communicating information and command selections to processor 140. Input device 165 may communicate user direction information and command selections to the processor 140.

Processor 140 may include, for example, one or more processors, controllers or central processing units ("CPUs"). Software 160 may be stored, for example, in memory 150. Software 160 may include any suitable software, for example, discrete smooth interpolation (DSI) software. A method for attenuating surface waves in common shot gathers of seismic data recorded by receiver 120 may be performed by software 160 being executed by processor 140 manipulating the data.

The processor 140 may be configured to randomly or semi-randomly generate a plurality of one-dimensional (1D) candidate Earth models, from which a subset of the plurality of candidate Earth models may be selected which best fits the common shot gather data for that iteration (e.g., each candidate selected for the subset have a difference between its synthetic dispersion spectrum and dispersion spectrum of the received common shot gather data, which is lower than a predetermined threshold). For example, the processor may be configured to randomly or semi-randomly generate a plurality of candidate one-dimensional (1D) Earth models from a random population, based on a range of variable values for physical properties such as h, $V_p$, $V_s$, density, $Q_p$ and $Q_s$ found in nature.

The processor 140 may be configured to iteratively execute a global difference minimization, such as a genetic algorithm, over a plurality of generations, to select an optimal Earth model from the subset of the plurality of candidate Earth models based on the common shot gather data. The processor 140 may be configured to, in each sequential generation, successively refine the sub-set of candidate Earth models to better fit the common shot gather data, until optimal Earth models in sequential generations converge.

The processor 140 may be configured to perturb the plurality of candidate Earth models which best fit the common shot gather data for a given iteration by altering one or more parameters in each of the sets of geophysical parameters to generate a new pool of candidate Earth models by mutation, crossover, or any other random or semi-random perturbation. In the next iteration, the processor 140 may be configured to replace or overwrite some or all of the pool of candidate Earth models saved in memory 150 with the new pool of candidate Earth models.

The processor 140 may be configured to select the subset of Earth models in two-phases. In the first phase, the processor 140 may be configured to select an initial subset of candidate Earth models by performing a global difference minimization, such as the genetic algorithm, between the dispersion spectra of the recorded and modeled common shot gather data. In the second phase, the processor 140 may be configured to perturb a set of geophysical parameters of the initial subset of candidate Earth models prior to performing a local difference minimization, such as Nelder-Mead (NM) downhill simplex method based on local adjustments of the initial subset of candidate Earth models. The processor 140 may be configured to replace or overwrite the pool of candidate Earth models saved in memory 150 with the new pool of candidate Earth models.

The processor 140 may be configured to perform high-resolution linear Radon transforms to generate the dispersion spectrum of the synthetic surface waves obtained from the candidate Earth models and the dispersion spectrum of the recorded 3D shot gather.

The processor 140 may be configured to determine a misfit between synthetic dispersion spectrum and the dispersion spectrum of the received common shot gather data e.g., by utilizing the objective function of EQN. 1.

The processor 140 may be configured to perform the propagator matrix method to quickly and efficiently generate synthetic surface waves from Earth models. The dispersion spectrum of synthetic surface waves and the dispersion spectrum of the received common shot gather data are utilized by the global optimization, such as the genetic algorithm, to evaluate the fit for determining an optimal model.

The processor 140 may be configured to generate synthetic surface waves from the optimal Earth model after optimal one-dimensional (1D) Earth models from two sequential generations converge. The processor 140 may be configured to attenuate or remove the synthetic surface waves from the common shot gather data to generate new common shot gather data that reduces the noise due to surface wave. The processor 140 may be configured to adaptively subtract the synthetic surface waves from the recorded seismic data.

The processor 140 may be configured to generate a new optimal Earth model after the synthetic surface wave has been subtracted from the input seismic data. The processor 140 may generate new synthetic surface waves from the new optimal Earth model based on that edited input seismic data. The processor 140 may be configured to subtract and/or adaptively subtract these new synthetic surface waves from the edited input seismic data. The processor 140 may be configured to iteratively continue this process until the surface wave in the edited input seismic data is completely attenuated or the effect of the remaining surface wave is negligible on the edited input seismic data.

Figure 6:
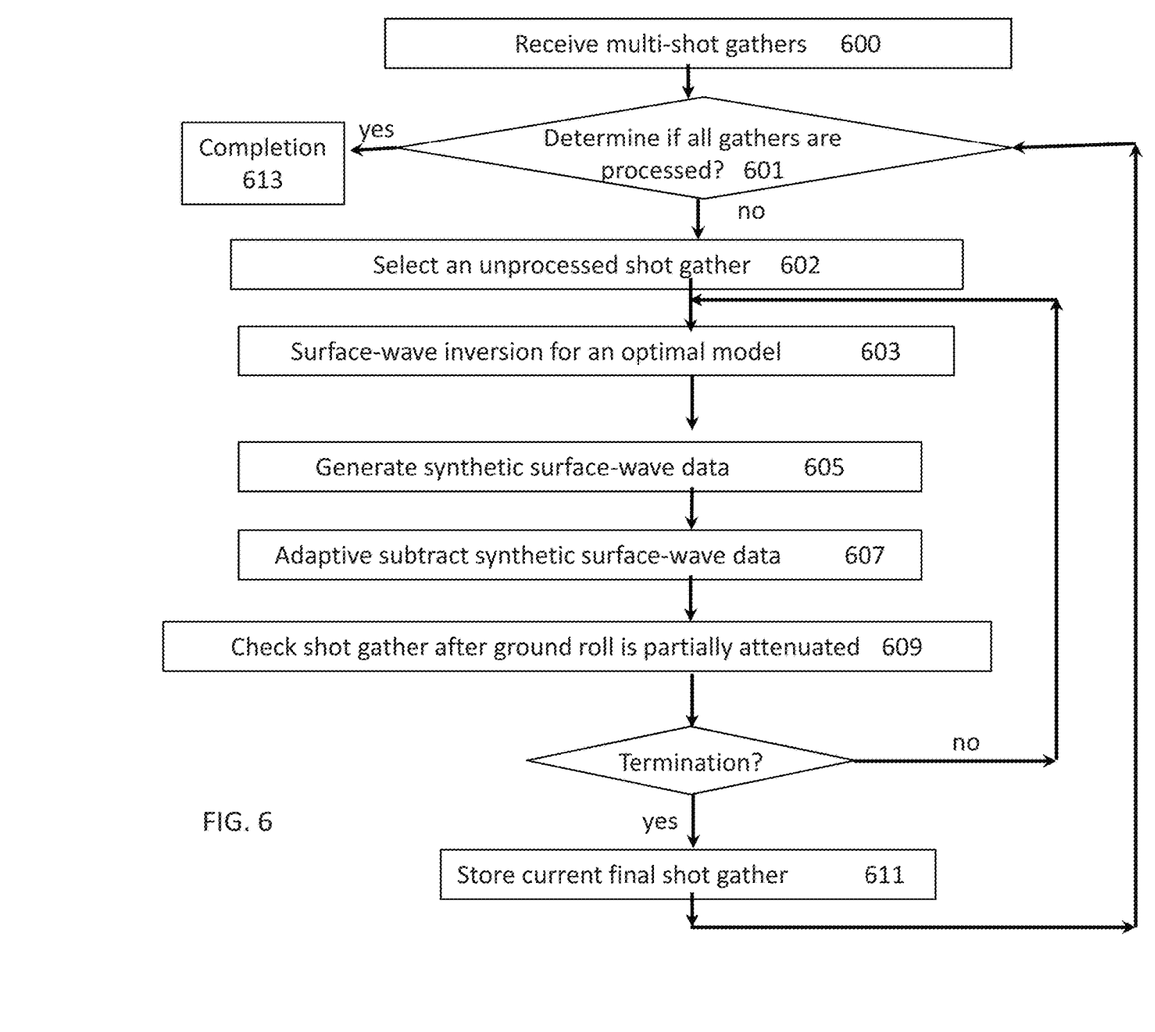
FIG. 6 is a flowchart of a method for improved attenuation of surface waves in common shot gathers of seismic data collected by a set of geophones, according to an embodiment of the invention.

Reference is made to FIG. 6, which is a flowchart of a method for improved attenuation of surface waves in common shot gathers of seismic data collected by a set of geophones, according to an embodiment of the invention. Operations 600-613 may be performed by one or more processors (e.g., 140 of FIG. 5).

In operation 600, a processor (e.g., 140 of FIG. 5) may receive multiple common shot gathers that aggregate seismic data recorded by a set of geophones (e.g., receiver 120 of FIG. 5). The common shot gathers may have noise/ground roll due to surface waves.

In operation 601, the processor may determine if all the shot gathers have been processed to attenuate or remove the noise/ground roll due to the surface waves, or if unattenuated shot gathers remain.

If all the shot gathers have not been processed, in operation 602, the processor may select an unprocessed shot gather to attenuate or remove the noise/ground roll.

In operation 603, the processor may perform surface wave inversion for the shot gather selected in operation 602 to select an optimal Earth model. In some embodiments of the invention, the processor is configured to select the optimal Earth model in two-phases.

In the first phase, the processor may be configured to select an initial subset of candidate Earth models by performing a global difference minimization, such as the genetic algorithm, over a plurality of generations to generate an optimal Earth model based on the common shot gather data received in operation 601. In some embodiments of the invention, the processor is configured to randomly or semi-randomly generate a plurality of candidate one-dimensional (1D) Earth models from a random population, e.g., based on a range of variable values for physical properties such as h, $V_p$, $V_s$, density, $Q_p$ and $Q_s$ found in nature. In some embodiments of the invention, the processor may be configured to globally perturb some or all of the plurality of candidate Earth models which best fit the common shot gather data for a given iteration by altering one or more parameters in each of the sets of geophysical parameters to generate a new pool of candidate Earth models by mutation, crossover, or any other random or semi-random perturbation. The processor may test how closely each model fits the recorded shot data to determine an initial subset of optimal candidate Earth models.

In the second phase, the processor may be configured to locally perturb a set of geophysical parameters of the initial subset of optimal candidate Earth models to perform a local difference minimization, such as Nelder-Mead (NM) downhill simplex method. The simplex method thus expands the candidate subset to create new locally perturbed Earth models. The subset of optimal models obtained from the genetic algorithm may be used as the initial models for the simplex method, which locally refines the subset to output a single final optimal Earth model.

In both phases of the two-phase process, each candidate Earth model is tested e.g., as follows:

1. Synthetic surface wave data is generated e.g., using a propagator matrix method.

2. The dispersion spectra from real data and synthetic data are calculated e.g., through high-resolution linear Radon transform.

3. The candidate Earth model is evaluated by the difference between the dispersion spectra.

The two-step process thereby generates an Earth model that is optimized globally, and then locally, to best fit the real world shot gather data.

In operation 605, the processor may generate synthetic surface waves based on the optimal Earth model selected in operation 603. In some embodiments of the invention, the processor may be configured to execute the propagator matrix method to generate the synthetic surface waves from the candidate Earth models.

In some embodiments of the invention, the processor may be configured to perform the Radon transform to quickly and efficiently generate the synthetic dispersion spectra from the synthetic waves and to calculate the dispersion spectrum of the received common shot gather data.

In operation 607, the processor may adaptively subtract the synthetic surface waves generated in operation 605 from the common shot gather data received in operation 601. In some embodiments of the invention, for the adaptive subtraction, a least-square matching filter is designed such that the residual energy between the seismic data and synthetic data is minimized. The synthetic surface waves may be convolved with the least-square matching filter prior to subtracting the synthetic surface waves from the common shot gather data.

In operation 609, the processor may check the shot gather after the ground roll has been partially attenuated to determine if the processing for the shot gather selected in operation 602 should be terminated. For example, the processor may determine if the current shot gather is done being processed by determining if optimal Earth models in sequential generations converge, as described previously. In some embodiments of the invention, the optimal Earth models in sequential generations or iterations of a genetic algorithm converge when minimum dispersion spectrum differences obtained in sequential generations or iterations are within a threshold measure of difference.

If the optimal Earth models do not converge, the processor may implement a multi-scale loop by returning to operation 603 and generate a new set of optimal Earth models from the updated common shot gather that had synthetic surface waves adaptively subtracted from it in operation 607. If the optimal Earth models do converge, then the processor may terminate the process for the current shot gather.

After the process has been terminated for the current shot gather, in operation 611, the processor may store the current final shot gather in a memory (e.g., memory 150 of FIG. 5). After the processor has stored the current final shot gather in the memory, the process may return to operation 601, in which the processor may determine if all the shot gathers have been processed to attenuate or remove the noise/ground roll due to the surface waves.

If all the shot gathers have been processed, in operation 613 the processor may have completed attenuating the ground roll from the multi-shot gathers and may stop processing the shot gathers. If all the shot gathers have not been processed, in operation 602, the processor may proceed to select an unprocessed shot gather to attenuate or remove the noise/ground roll.

Figure 7:
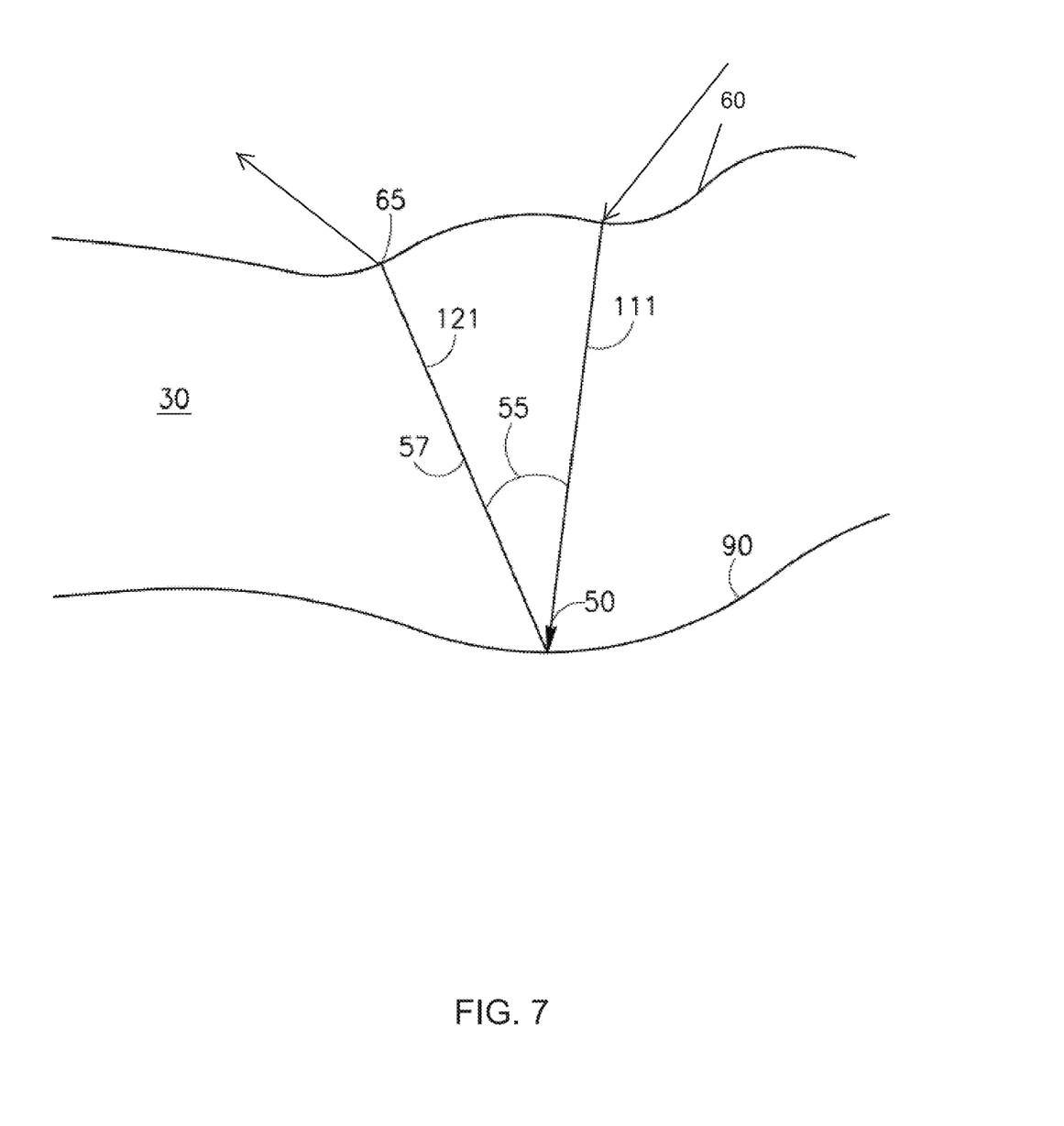
FIG. 7 schematically illustrates seismic tomography in which a series of incident and reflected waves propagate through a subsurface region of the Earth to image the subsurface according to an embodiment of the invention.

Reference is made to FIG. 7, which is a schematic illustration of a geological tomography technique that may be used to record input seismic data (e.g., as shown in FIG. 1(d)). FIG. 7 shows an example of a penetrating incident ray 111 and corresponding reflected ray 121 that propagate through a subsurface region of the Earth 30 to image the subsurface, according to an embodiment of the invention.

One or more transmitter(s) (e.g., 190 of FIG. 5) located at incident location(s) 60 may emit incident rays 111. Incident rays 111 may include for example a plurality of energy rays related to signal waves, e.g., sonic waves, seismic waves, compression waves, etc. Incident rays 111 may be incident on, and reflect off of, a subsurface structure or surface 90 at a reflection point 50. Multiple reflection points 50 may be identified or imaged or displayed in conjunction to display, for example, a horizon.

One or more receiver(s) (e.g., 120 of FIG. 5) located at reflected location(s) 65 may receive the reflection rays 121. Reflection rays 121 may be the reflected images of incident rays 111, for example, after reflecting off of image surface 90 at target point 50. The angle of reflection 55 may be the angle between corresponding incident rays 111 and reflected rays 121 at reflection point 50 (or a half angle may be used). An incident rays 111 and corresponding reflected rays 121 may propagate through a cross-section of a subsurface structure 30. Incident rays 111 may reflect off of a subsurface feature 90 at a reflection point 50, for example, a point on an underground horizon, the seafloor, an underground aquifer, etc.

One or more processor(s) (e.g., 140 of FIG. 5) may reconstitute incident and reflected rays 111 and 121 to generate an image the subsurface 30 using an imaging mechanism. For example, a common reflection angle migration (CRAM) imaging mechanism may image reflection points 50 by aggregating all reflected signals that may correspond to a reflection point, for example, reflected signals that may have the same reflection angle. In other examples, imaging mechanisms may aggregate reflected signals that may have the same reflection offset (distance between transmitter and receiver), travel time, or other suitable conditions.

Geological tomography captures both desirable penetrating waves and undesirable surface waves. Rays 111 and 121 shown in FIG. 7 are examples of penetrating waves that propagate through the interior subsurface of the Earth 30 and reflect at points 50 along boundaries of subsurface layers 90. In contrast, surface waves travels at or near ground surface locations 60, but do not penetrate the deeper layers within the subsurface. After acquiring waves via tomographic scanning, embodiments of the invention apply surface wave attenuation techniques disclosed herein to preserve desired signals due to penetrating waves, while reducing or eliminating coherent noises due to surface waves in a shot gather.

Following surface wave attenuation, the processor(s) may compose the tomographic data to generate an improved image or model of reflection points 50 of the underground subsurface of the Earth 30. One or more display(s) (e.g., 180 of FIG. 5) may visualize the present-day subsurface image 30.

In the foregoing description, various aspects of the present invention have been described. For purposes of explanation, specific configurations and details have been set forth in order to provide a thorough understanding of the present invention. However, it will also be apparent to one skilled in the art that the present invention may be practiced without the specific details presented herein. Furthermore, well known features may have been omitted or simplified in order not to obscure the present invention. Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

Embodiments of the invention may manipulate data representations of real-world objects and entities such as underground geological features, including faults and other features. The data may be generated by tomographic scanning, as discussed in reference to FIG. 7, e.g., received by for example a receiver receiving waves generated e.g., by an air gun or explosives, that may be manipulated and stored, e.g., in memory 150 of FIG. 5, and data such as images representing underground features may be presented to a user, e.g., as a visualization on display 180 of FIG. 5.

When used herein, a subsurface image or model may refer to a computer-representation or visualization of actual geological features such as horizons and faults that exist in the real world. Some features when represented in a computing device may be approximations or estimates of a real world feature, or a virtual or idealized feature. A model, or a model representing subsurface features or the location of those features, is typically an estimate or a "model", which may approximate or estimate the physical subsurface structure being modeled with more or less accuracy.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

The invention claimed is:

1. A method for attenuating surface waves in common shot gathers of seismic data recorded by a set of geophones, the method comprising:
   receiving common shot gather data recorded by a set of geophones with noise due to surface waves;
   iteratively executing a genetic algorithm over a plurality of generations to generate an optimal Earth model based on the common shot gather data by, in each sequential generation, successively refining a pool of candidate Earth models to better fit the common shot gather data, until optimal Earth models in sequential generations converge, wherein the pool of candidate Earth models are each one-dimensional (1D) and defined by a different set of geophysical parameters that are only allowed to vary vertically, but not laterally;
   generating synthetic surface wave data based on the optimal Earth model and canceling the synthetic surface wave data from the common shot gather data to generate new common shot gather data that reduces the noise due to surface waves; and
   iteratively executing the genetic algorithm over each new common shot gather data until optimal Earth models generated in sequential iterations of the genetic algorithm converge.

2. The method of claim 1, wherein each generation of the genetic algorithm comprises:
   generating a pool of candidate Earth models;
   selecting a subset of the pool of candidate Earth models that best fit the common shot gather data;
   perturbing the subset of candidate Earth models by randomly or semi-randomly altering the set of geophysical parameters for each candidate Earth model to generate a new pool of candidate Earth models; and
   replacing the pool of candidate Earth models with the new pool of candidate Earth models until an optimal Earth model in sequential generations converge.

3. The method of claim 2, wherein the subset of Earth models are selected that each have a difference between a dispersion spectrum of modeled common shot gather data generated based on the candidate Earth model and a dispersion spectrum of the received common shot gather data which is below a predetermined threshold.

4. The method of claim 3, wherein the subset of Earth models are selected in two-phases comprising:
   in a first phase, performing a global difference minimization between the dispersion spectra of the recorded and modeled common shot gather data to select an initial subset of the candidate Earth models; and
   in a second phase, performing a local difference minimization between the dispersion spectra of the recorded common shot gather data and modeled common shot gather data generated based on local adjustments of the initial subset of candidate Earth models generated by locally perturbing the set of geophysical parameters thereof.

5. The method of claim 4, wherein the global difference minimization is performed using the genetic algorithm.

6. The method of claim 4, wherein the local difference minimization is performed using a Nelder-Mead (NM) downhill simplex method.

7. The method of claim 3 comprising generating the dispersion spectra by high-resolution linear Radon transforms of the recorded and modeled common shot gather data.

8. The method of claim 2, wherein perturbing the subset of candidate Earth models comprises altering one or more parameters in each of the sets of geophysical parameters by mutation, crossover, or random or semi-random perturbation.

9. The method of claim 1 comprising applying a matching filter to optimize the synthetic surface wave data.

10. The method of claim 1, wherein the synthetic surface wave data is cancelled from the common shot gather data by adaptive subtraction.

11. The method of claim 3, wherein the optimal Earth models in sequential generations of the genetic algorithm converge when the minimum dispersion spectrum differences obtained in sequential generations are within a threshold measure of difference.

12. The method of claim 3, wherein optimal Earth models generated in sequential iterations of the genetic algorithm converge when the minimum dispersion spectrum differences obtained in sequential iterations are within a threshold measure of difference.

13. The method of claim 1, wherein each different set of geophysical parameters defines different value combinations of geophysical parameters selected from the group consisting of: thickness, P-wave velocity ($V_p$), S-wave velocity ($V_s$), density, and quality factors ($Q_p$ and $Q_s$) for P- and S-waves.

14. The method of claim 1, wherein the Earth models are viscoelastic, non-elastic, elastic, or acoustic.

15. The method of claim 1 comprising iteratively executing the genetic algorithm for a plurality of subsets of the received common shot gather data divided into different azimuth ranges.

16. The method of claim 1 comprising applying a propagator matrix method to generate the synthetic surface wave data.

17. A system for attenuating surface waves in common shot gathers of seismic data recorded by a set of geophones, the system comprising:
  one or more memories configured to:
    store common shot gather data recorded by a set of geophones with noise due to surface waves;
  one or more processors configured to:
    iteratively execute a genetic algorithm over a plurality of generations to generate an optimal Earth model based on the common shot gather data by, in each sequential generation, successively refining a pool of candidate Earth models to better fit the common shot gather data, until optimal Earth models in sequential generations converge, wherein the pool of candidate Earth models are each one-dimensional (1D) and defined by a different set of geophysical parameters that are only allowed to vary vertically, but not laterally;
    generate synthetic surface wave data based on the optimal Earth model and canceling the synthetic surface wave data from the common shot gather data to generate new common shot gather data that reduces the noise due to surface waves;
    iteratively execute the genetic algorithm over each new common shot gather data until optimal Earth models generated in sequential iterations of the genetic algorithm converge; and
    storing in the one or more memories the new common shot gather data output in a final iteration of the genetic algorithm.

18. The system of claim 17, wherein, in each generation of the genetic algorithm, the one or more processors are configured to:
  generate a pool of candidate Earth models;
  select a subset of the pool of candidate Earth models that best fit the common shot gather data;
  perturb the subset of candidate Earth models by randomly or semi-randomly altering the set of geophysical parameters for each candidate Earth model to generate a new pool of candidate Earth models; and
  replace the pool of candidate Earth models with the new pool of candidate Earth models until an optimal Earth model in sequential generations converge.

19. The system of claim 18, wherein the one or more processors are configured to select the subset of Earth models that each have a difference between a dispersion spectrum of modeled common shot gather data generated based on the candidate Earth model and a dispersion spectrum of the received common shot gather data which is below a predetermined threshold.

20. The system of claim 19, wherein the one or more processors are configured to select the subset of Earth models in two-phases comprising:
  in a first phase, performing a global difference minimization between the dispersion spectra of the recorded and modeled common shot gather data to select an initial subset of the candidate Earth models; and
  in a second phase, performing a local difference minimization between the dispersion spectra of the recorded common shot gather data and modeled common shot gather data generated based on local adjustments of the initial subset of candidate Earth models generated by locally perturbing the set of geophysical parameters thereof.

21. The system of claim 20, wherein the one or more processors are configured to perform the global difference minimization using the genetic algorithm.

22. The system of claim 20, wherein the one or more processors are configured to perform the local difference minimization using a Nelder-Mead (NM) downhill simplex method.

23. The system of claim 18, wherein the one or more processors are configured to perturb the subset of candidate Earth models by altering one or more parameters in each of the sets of geophysical parameters by mutation, crossover, or random or semi-random perturbation.

24. The system of claim 17, wherein the one or more processors are configured to apply a propagator matrix method to generate the synthetic surface wave data.

25. The system of claim 17, wherein the one or more processors are configured to apply a matching filter to optimize the synthetic surface wave data.

26. The system of claim 17, wherein the one or more processors are configured to cancel the synthetic surface wave data from the common shot gather data by adaptive subtraction.

* * * * *